Oct. 22, 1963     W. W. WILLIAMS     3,107,473
COTTON HARVESTER
Filed Nov. 6, 1959     5 Sheets-Sheet 3
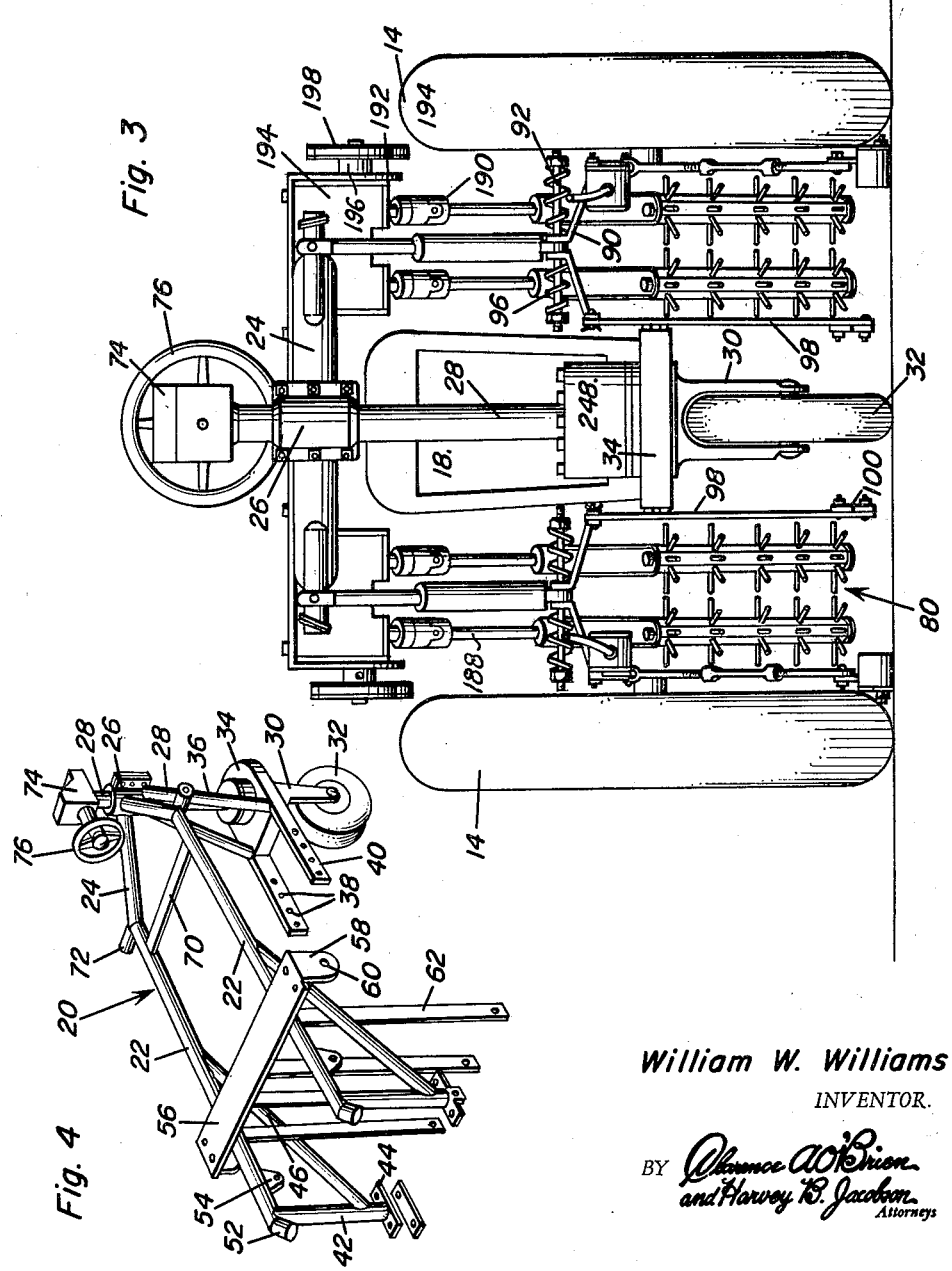
William W. Williams
INVENTOR.

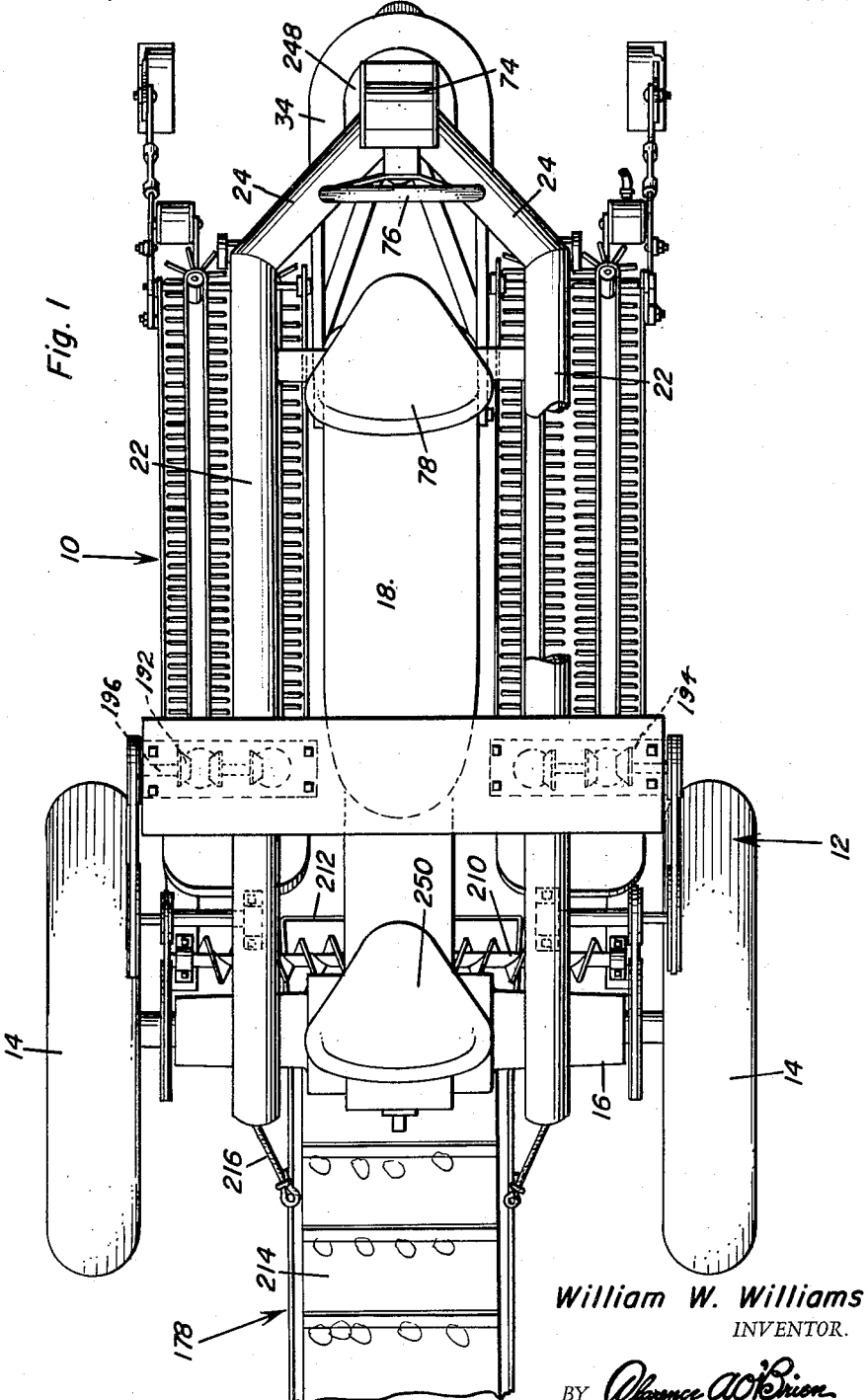

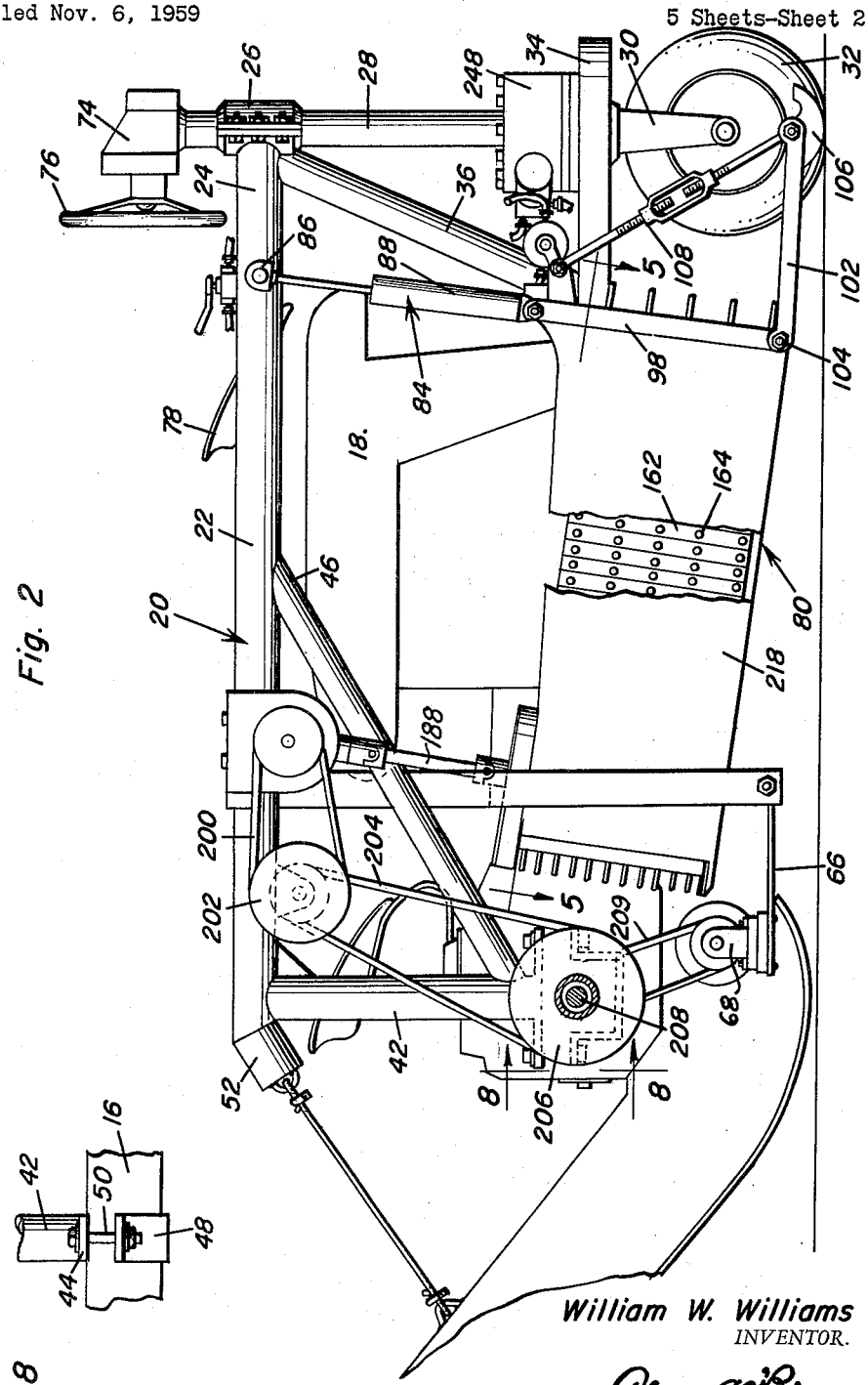

Oct. 22, 1963  W. W. WILLIAMS  3,107,473
COTTON HARVESTER
Filed Nov. 6, 1959  5 Sheets-Sheet 4
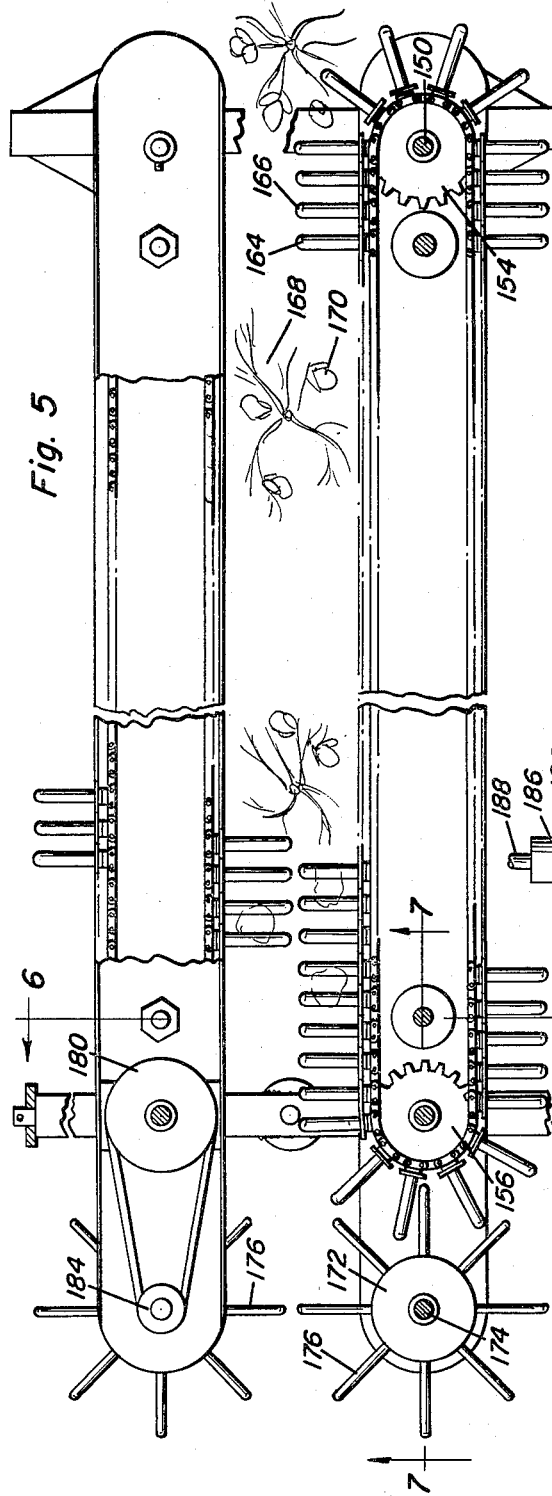
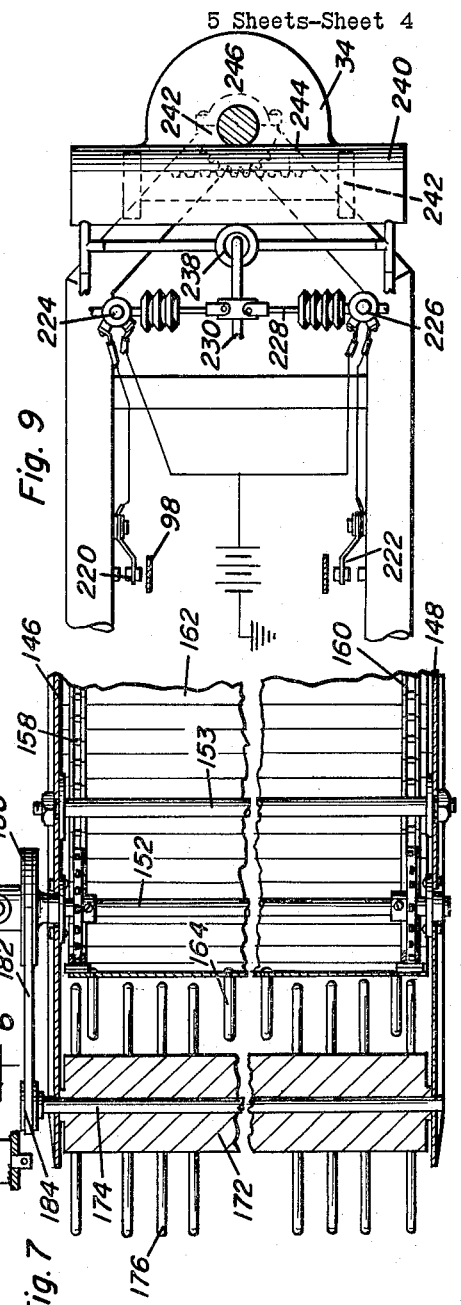
William W. Williams
INVENTOR.

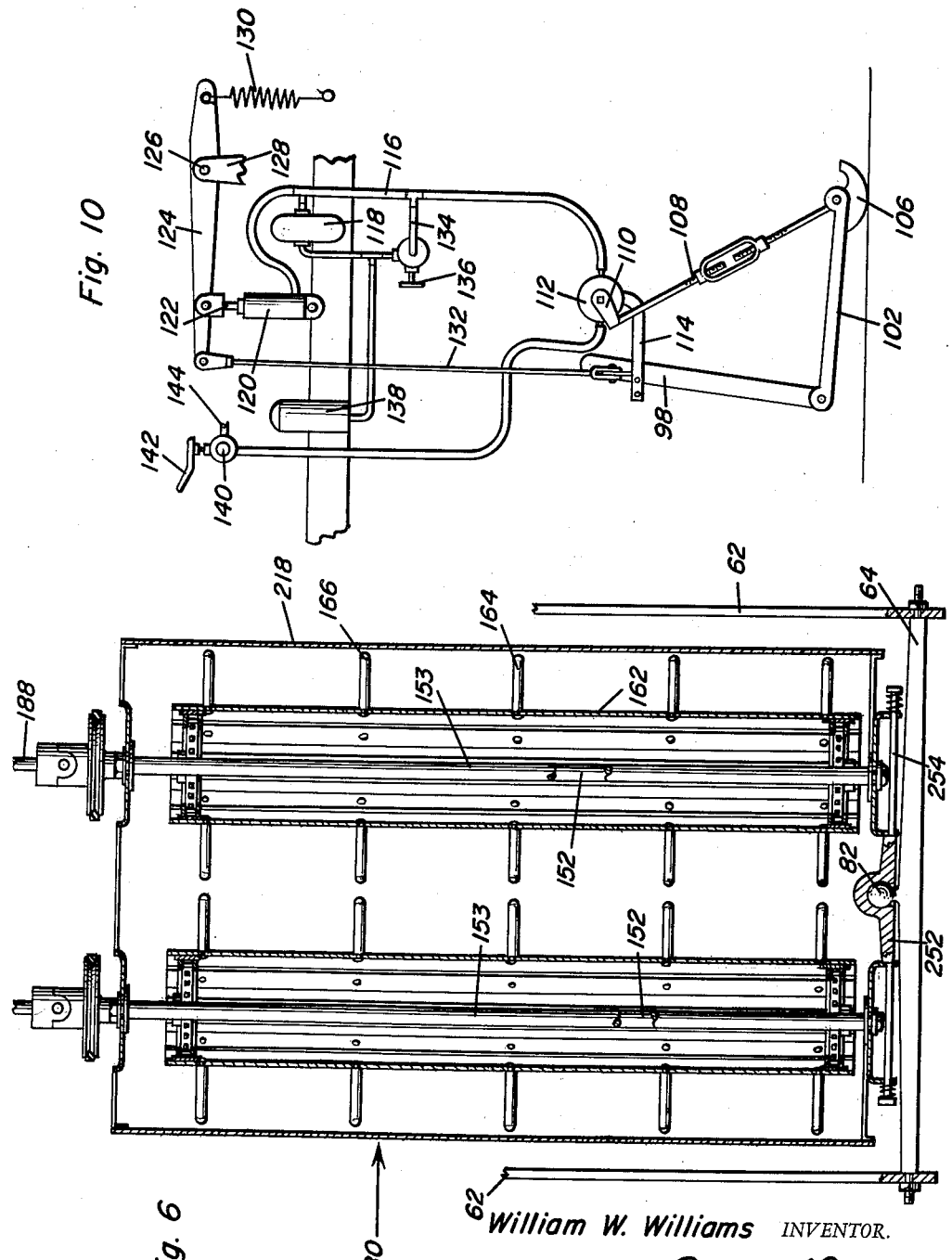

3,107,473
COTTON HARVESTER
William W. Williams, 101 W. Palestine, Box 884, Mexia, Tex.
Filed Nov. 6, 1959, Ser. No. 851,448
10 Claims. (Cl. 56—49)

The present invention generally relates to farm machinery and more particularly to cotton harvesters and similar types of tools or implements with there being provided several novel features capable of use with various implements.

One of the problems which exists with many farm implements is to have the working component of the implement follow the contour of the terrain being traversed by the implement. For example, in harvesting cotton, it is desirable that the cotton harvester have the mechanism for removing the cotton bolls extend downwardly to a point adjacent the ground surface but yet spaced from the ground sufficiently that it will not drag or otherwise come into engagement with the ground surface. While cotton harvesters and similar instruments have been provided with devices for manually controlling the elevational position thereof, such devices have not been found satisfactory since the manual control of the elevational position of the working implement by the operator cannot be effectively accomplished due to the speed of operation and due to other duties of the operator of the equipment. Therefore, it is the primary object of the present invention to provide an automatic control device that will maintain the position of the picker unit of the cotton harvester as close to the ground as possible without dragging.

An ancillary object of the present invention to that set forth in the immediately preceding paragraph is the provision of an automatic control device which operates a fluid pressure valve for raising and lowering the picker unit by a suitable fluid pressure arrangement whereby the feeler element which precedes the picker unit and engages the ground surface need not suport any of the weight of the picker unit but only support its own weight and be of sufficient strength to operate a control valve in accordance with movements of the feeler device as it traverses the ground surface in immediately preceding relation to the picker unit thereby allowing time for the feeler device to sense the variations in ground level and to provide sufficient time for the fluid pressure system to automatically adjust the picker unit in anticipation of the change in ground level. While this mechanism for controlling the elevational position of the picker unit is specifically adapted to cotton harvesters, it can be equally as effective in use with other types of agricultural implements such as plows, beet harvesters, potato diggers or in any device for gauging the plowing depth or running depth of the working component of the implement.

Another problem which exists in cotton harvesters and other similar instruments is the provision of a steering control mechanism which will enable the picker unit to be properly orientated in relation to the row crop which in this instance is cotton. In the operation of the picker unit, the picker unit will operate most effectively if the picker unit accurately receives the row of cotton therein so that the row of cotton will pass between the components of the picker unit. In conventional cotton harvesters, the picker units are mounted stationarily on a frame and while an operator may control the path of movement of the frame, there is no means for varying the positions of the picker units when the rows converge slightly or diverge slightly in relation to each other which is a quite common occurrence. Accordingly, it is the primary object of the present invention to suspend the picker unit from a supporting frame in such a manner that the picker units may swing or move laterally to receive the cotton plants centrally therein with the construction of the picker unit being such that it will automatically receive the cotton row and centralize itself in relation to the cotton plants as they pass through the picker unit thereby maintaining a proper relationship of the picker unit and cotton plants during the stripping operation.

Another important object of the present invention is to provide a cotton harvester in accordance with the immediate preceding object in which the movable picker units also effect steering control of the harvester so that the harvester will be automatically steered to conform to curvatures of the rows of cotton plants with the rows of cotton plants actually forming a guide for steering control of the harvester since the picker unit is so constructed that it will seat to centralize the plants as they pass therethrough thereby causing the harvester to be steerably controlled in response to variations in the direction or position of the cotton plants in a cotton row.

Another important factor in the present invention is to provide a cotton picker unit which incorporates vertically disposed endless belt members having parallel runs facing each other with the belts being made from a plurality of connected slats and with there being provided inwardly extending fingers which are disposed in facing relation and which travel in an inclined path. The fingers are drivingly powered at a speed equal to the speed of the harvester whereby the rearward movement of the facing fingers will be the same as the rearward movement of the cotton plants as they pass through the picker units. Thus, no relative lateral movement of the fingers in relation to the cotton plants occurs but only relative upward movement of the fingers occurs as the cotton plants and fingers move rearwardly in unison due to the inclined path of movement of the fingers whereby the fingers strip the cotton from the plants in a pure upward stripping movement rather than in any lateral stripping action which causes damage to the cotton plant and also strips more foreign material into the cotton such as leaves, stems and the like.

Still another object of the invention is to provide a picker unit in which the stripping fingers mentioned in the immediately preceding object are provided with a stripper at the discharge end thereof for removing all of the cotton from between the fingers thereby preventing any cotton from becoming packed between the stripper fingers.

Other objects of the present invention will reside in its simplicity of construction, ease of operation, automatic controls, efficiency in operation and its relatively fool proof and inexpensively maintained structure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the cotton harvester of the present invention with parts broken away;

FIGURE 2 is a side elevational view of the cotton harvester with portions broken away for clarity;

FIGURE 3 is a front elevational view of the cotton harvester;

FIGURE 4 is a perspective view, on a reduced scale, of the framework of the cotton harvester;

FIGURE 5 is a detailed plan sectional view, on an enlarged scale, taken substantially upon a plane passing along section line 5—5 of FIGURE 2, with portions broken away, illustrating the construction of the picker unit;

FIGURE 6 is a transverse, sectional view taken substantially upon a plane passing along section line 6—6 of FIGURE 5 illustrating further structural details of the picker unit;

FIGURE 7 is a detailed sectional view taken substantially upon a plane passing along section line 7—7 of FIGURE 5 illustrating the structure of the stripper mechanism and the drive mechanism therefor;

FIGURE 8 is a detailed view taken substantially upon a plane taken along reference line 8—8 of FIGURE 2 illustrating the manner in which the supporting frame is attached to the axle housing;

FIGURE 9 is a schematic plan view illustrating a steering control mechanism responsive to lateral movement of the picker units for automatically controlling the steerable wheels of the cotton harvester;

FIGURE 10 is a schematic view of the hydraulic control mechanism for changing the elevational position of the forward end of the picker units in response to a ground engaging feeler shoe or skid.

Referring now specifically to the drawings, the numeral 10 generally designates the cotton harvester of the present invention which incorporates in its construction what basically may be considered a tractor generally designated by the numeral 12 having the usual rear ground engaging drive wheels 14, a transverse axle housing 16, a longitudinally forwardly extending frame, engine and fuel tank structure 18. The details of the tractor mechanism are not shown and attached to the tractor mechanism is a frame generally designated by the numeral 20 which is illustrated in FIGURE 4 in detached relationship and which is illustrated in the other figures of the drawing in attached relationship to the tractor.

The frame 20 includes a pair of longitudinal rails 22 which may be conveniently hollow pipes or the like which are disposed in parallel relation to each other. The forward ends of the rails 22 are provided with converging portions 24 which are joined together by a split cylindrical sleeve 26 at the apex thereof. The split sleeve 26 receives a vertical column 28 having a steering shaft extending vertically therethrough and connected to a yoke 30 at the lower end thereof which carries a steerable front wheel or wheels 32. The lower end of the column 28 is rigidly affixed to a horizontally disposed plate-like member 34 which is braced by a pair of inclined brace members 36 extending from the rear corner thereof upwardly and forwardly for connection to the sleeve 26 at the juncture with the converging portions 24. Extending rearwardly from the plate 34 is a pair of connector members 38 having a plurality of apertures 40 for connection to the tractor frame by suitable bolts and the like.

Extending downwardly from each of the rails 22 and adjacent the rear end thereof is a depending column 42 terminating in a longitudinally extending aperture plate 44. Each column 42 is braced by a longitudinal inclined brace 46 which rigidifies the columns 42. The colums 42 are connected to the axle housing 16 by virtue of a U-shaped clamp collar 48 and clamp bolts 50 as illustrated in FIGURE 8.

The rear terminal ends of the rails 22 disposed rearwardly of the columns 42 are inclined downwardly as indicated by the numeral 52 and each rail 22 is provided with a depending apertured lug 54 immediately forwardly of the column 42.

Extending transversely of the rails 22 adjacent the rear thereof but forwardly of the lugs 54 is a plate member 56 having depending end lugs 58 provided with an aperture 60. Extending downwardly from each of the rails 22 in underlying relation to the plate 56 are support members 62 with the lower ends of the support members being interconnected by transverse members 64. Extending rearwardly from the transverse members 64 is a pair of end brackets 66 and a bracket 68 all of which extend longitudinally and rearwardly. It is pointed out that the plate 56 extends beyond the rails 22 while the members 62 extend downwardly from the rails.

Extending transversely of the rail 22 adjacent the forward end thereof is a transverse brace member 70 and attached to the rails 22 at the juncture with the converging portions 24 is a pair of outwardly extending support pin-like members 72. All of the components of the structure previously described may be rigidly secured together in any suitable manner such as by welding or the like. The upper end of the column 28 is provided with a gear box 74 having a steering wheel 76 connected thereto and extending rearwardly therefrom so that an operator supported on a seat 78 carried by the transverse brace 70 will have access to the steering wheel 76 for controlling operation of the steerable wheel 32.

Supported on either side of the tractor and frame unit is a picker unit generally designated by the numeral 80 with the rear end of the picker unit being supported by a universal connection to the transverse support member 64 by virtue of a ball and socket connection 82. The forward end of each picker is supported by a piston and cylinder assembly 84 in which the piston rod is connected to the outwardly extending pins 72 with a universal connection designated by the numeral 86 which will enable pivotal movement or swinging movement of the piston and cylinder assembly 84 in any direction in relation to the pin 72. The lower end of the cylinder 88 of the piston and cylinder assembly 84 is pivotally connected to a pair of outwardly extending support brackets 90 by an elongated bolt 92 having a nut threaded on each end and having a spring 96 interposed between each bolt and the inner end of each bracket 90 thus resiliently urging the brackets 90 against the mounting lug on the lower end of the cylinder 88 but permitting lateral swinging movement of the mounting brackets 90 in relation to the pivot bolt 92 and in relation to the cylinder 88. The outer end of each bracket 90 is provided with a downwardly extending support link 98 and the lower ends of the support links are connected with a longitudinally extending link 100 on the inner side of the picker unit and on the outer side of the picker unit, the link 98 is also connected to a forwardly extending link 102 by a pivot pin 104. The forward end of the link 102 carries a ground engaging skid, shoe, gauge wheel or other feeler means 106 for surface engagement with the ground surface. Extending upwardly from the outer end of the link 102 is a turnbuckle assembly in the form of a connecting rod 108 which connects to the operating handle 110 of a hydraulic fluid regulating valve 112 supported by a bracket 114 from the outer link 98.

The regulating valve 112 is for the purpose of controlling fluid pressure in the cylinder 88 for orientating the front end of the picker unit in response to changes in elevation of skid 106 such as when it hits an elevational rise or depression in the ground surface.

FIGURE 10 illustrates an arrangement of components of a modified form of the structure shown in FIGURE 2 and previously described in which the skid and associated structure is the same except that the valve 112 will act as a restriction in the discharge flow line 116 of a pump 118 thus causing a build-up of pressure in the discharge flow line 116 so that such increase in pressure will be forced into the cylinder 120 of a piston and cylinder arrangement in which the piston rod 122 extends upwardly therefrom and is connected to a pivotal beam 124 supported by a pin 126 on a support 128 and resiliently urged by spring 130 to a position with the end thereof having the piston rod 122 connected thereto to an upper position. Thus, the spring 130 acts to normally support the forward end of the picker unit by virtue of the connecting rod 132 which extends downwardly from the free end of the beam to the link 98 at the forward end of the picker unit. The pump 118 is provided with a bypass line 134 and a bypass valve 136 and also is connected to a reservoir 138. However, the discharge line 116 extends through the valve housing 112 and also through a manual valve housing 140 having a manual handle 142 thereon and provided with a conduit 144 extending back to the reservoir 138. Thus, the pump 118 will normally circulate liquid either through the bypass line 134 or through the conduits 116 when the valve 112 is open. However, when the valve 112 is closed and the valve 136 is either closed or forms a restriction, then the pressure build-up in the line 116 will cause the piston and cylinder assembly to elevate the forward end of the cotton harvester. The same results may be accomplished by the manual valve 142 by merely turning the manual valve 142 to a closed position thus causing build-up in pressure in the discharge line 116 and subsequent elevation of the free end of the beam 124 thereby elevating the forward end of the cotton harvester from its original position in anticipation of a rise in the elevation of the ground surface immediately preceding the picker units.

Each picker unit 80 includes an elongated and relatively narrow top plate 146 and a corresponding bottom plate 148. Supported at the forward end of the picker unit is a forward shaft 150 and supported at the rear end of the plates 148 and 146 but spaced from the ends thereof is a similar shaft 152. Spacer rods 153 rigidify and extend between plates 146 and 148. Mounted on the shaft 150 is a pair of sprocket gears 154 and mounted on the shaft 152 is a pair of sprocket gears 156. Encircling the upper gears is a sprocket chain 158 immediately underlying the plate 146 and encircling the lower gears 154 and 156 is a lower sprocket chain 160 disposed immediately above the lower plate 148. Interconnecting the sprocket chains 158 and 160 is a plurality of slats 162 which may be articulately connected together so that the slats may proceed around the sprocket gears thereby forming a slat-type conveyor.

Mounted on each of the slats is a plurality of projecting fingers 164 with the fingers on the adjacent assembly being disposed in closely spaced relation to each other and it is pointed out that the ends of the fingers 164 are rounded as designated by the numeral 166 to prevent the fingers from barking or otherwise causing the cotton plant 168 to be damaged while the cotton bolls 170 are being removed therefrom by the fingers. Inasmuch as the fingers 164 move rearwardly at the same rate of speed as the rearward movement of the cotton plants in relation to the harvester, it will be readily apparent that the cotton bolls are gently lifted upwardly away from the plants by the fingers as the plants move downwardly relative to the fingers and with the rounded ends, such fingers will not cause damage to the cotton bolls or cotton plants. One of the shafts 150 or 152 may be adjustably mounted for taking up slack in the sprocket chains.

The upper and lower plants 146 and 148 extend rearwardly and journal a roller 172 with the roller 172 being mounted on a shaft 174. The roller 172 is provided with a plurality of radially extending tines 176 which will overlap and pass closely adjacent to the periphery of the slats 162 as they proceed around the sprocket gears 156 thus stripping the cotton bolls 170 from the fingers 164 and depositing the cotton bolls into a conveying mechanism generally designated by the numeral 178. The shaft 174 is driven from a V-belt pulley 180 carried on the shaft 152 and a V-belt 182 connected to a pulley 184 on the upper end of the shaft 174. The V-belt pulley 180 is connected by a universal joint connection 186 to a drive shaft 188 which extends upwardly and has a universal coupling 190 at the upper end thereof and a bevel gear 192 extending into a gear box 194 attached to the plate 56. Power input to the gear box 194 is through shaft 196 which is driven from a V-belt pulley 198 and a V-belt 200 which extends rearwardly to a reduction V-belt pulley assembly 202 which is driven from a V-belt 204 extending downwardly to a drive pulley 206 that is carried by the axle 208. The axle 208 is also provided with a V-belt assembly for driving a V-belt 209 to the drive shaft of the conveyor assembly 178 with the conveyor assembly including screw augers 210 having opposite spiral flights for moving the material inwardly with the screw auger 210 being received in a trough-like member 212 which centrally dumps the cotton onto a slatted belt conveyor 214 that is supported in position by tension members 216 extending from the conveyor 178 to the terminal ends 52 of the rails 22. The conveying mechanism including the screw auger is supported from the rearwardly extending brackets 66 and also 68. The outer side surface of the picker unit is enclosed with side panels 218 to protect the fingers from damage and also to prevent persons or animals from coming into contact with the fingers.

Referring now to FIGURE 9, there is illustrated schematically an arrangement for automatic control of the front steerable wheel. Inasmuch as the fingers will engage the cotton plants, this will cause lateral swinging movement of the picker units. A pair of contact switches 220 and 222 engageable by the supporting rods or links 98 which will close or open the switches 220 and 222 for controlling the operation of valves 224 and 226 with the valves being connected with a linkage 228 including a handle 230 for controlling the valve 238 for admitting fluid pressure into one end of a double acting cylinder 240 with the piston 242 having a rack 244 attached thereto in meshing engagement with a pinion gear 242 for driving the pinion gear from the rack construction.

The pinion gear 242 is carried by the steering rod or shaft 246 and is received within a housing 248 disposed above the plate 34. Also note that the switches 220 and 222 are of the double pole type and that they will operate the valves 224 and 226 upon lateral deflection of the picker unit in either direction for causing the tractor unit and the entire harvester to be guided towards the direction of movement of the picker unit. For example, if the picker unit is in engagement with a cotton row which curves outwardly away from the path of movement of the harvester, the engagement of the fingers with the cotton plant will normally cause the cotton plant to be centralized within the picker unit. This causes the picker unit to move laterally outwardly and bring into contact the switch elements for operating the steering control mechanism to turn the steerable wheel towards the direction of the section of the row of cotton.

A second seat 250 is provided for a second operator in order to observe the stripping and conveying mechanism. Also, the rear end of each stripping conveyor is centralized by a socket member 252 having a pair of outwardly extending rods 254 slidably mounting the inverted channel shaped bottom plate 148. The outer end of each rod 254 is provided with a nut 256 and a coil spring 258 is disposed between the nut and the corresponding bottom plate 148 for urging the plates 148 inwardly to a centralized position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a cotton harvester, a cotton picker unit comprising a pair of side by side stripping assemblies receiving cotton plants therebetween, each stripping assembly including a pair of shafts supported for rotation about parallel axes inclined upwardly and in the direction of movement of the picker unit with the rear shaft being disposed with the lower end thereof above the horizontal plane of the lower end of the forward shaft, a pair of sprocket gears mounted on each shaft, the gears on the forward shaft being aligned with the gears on the rear shaft, a pair of parallel sprocket chains encircling the aligned gears, a plurality of slats mounted on said chains for movement in an endless path, means drivingly engaged with one of said shafts, each slat including a plurality of projecting stripping fingers extending perpendicularly therefrom for engagement with cotton bolls and for movement rearwardly with the cotton bolls as the cotton plants pass between the assemblies during forward movement of the picker unit whereby only relative vertical movement occurs between the cotton plant and the stripping fingers.

2. The structure as defined in claim 1 together with a rotatable roller mounted rearwardly of and parallel to the rear shaft in spaced relation to the endless path of the slats and rotatable about an axis parallel to the rotational axis of the rear shaft, said rotatable roller including a plurality of radially extending tines thereon movable between the fingers on the slats for stripping the cotton from the fingers on the slats.

3. In a cotton harvester having a mobile frame, and a hydraulic pressure system carried by the frame, a cotton picker unit mounted on the frame generally in parallel relation to the path of movement of the frame for straddling and receiving a row of cotton plants, means supporting the rear of the picker unit from the frame for vertical swinging movement of the picker unit about a generally transverse axis adjacent the rear of the unit, means suspending the forward portion of the picker unit from the frame for lateral swinging movement whereby the unit may be aligned with a row of plants, and means connected with the suspending means for engaging the ground surface and changing the elevational position of the forward end of the picker unit in response to variations in the terrain, said picker unit including a pair of side by side and laterally spaced slat type endless conveyors disposed in vertical position with the conveyors running from a front lower position to a rear elevated position, each of said conveyors including projecting fingers which travel in a rearwardly and upwardly inclined path so that as the fingers engage the cotton bolls on the cotton plants and move rearwardly at the same speed as the cotton plants in relation to the conveyors, the stripping action of the fingers will be in a vertical direction only and longitudinally of the cotton plants thereby more easily removing the bolls from the plants with the least possible damage to the plants.

4. The structure as defined in claim 3 wherein each of the projecting fingers is provided with a rounded end to prevent the fingers from piercing the cotton plants or knocking bark from the cotton plants.

5. The structure as defined in claim 4 wherein each picker unit includes stripping means disposed at the rear of each conveyor for removing cotton bolls from the fingers, said stripping means including a driven member rotatable about an axis parallel to the surface of the conveyor and including a plurality of radially projecting tines for passing between the fingers on the conveyor and removing cotton therefrom.

6. The structure as defined in claim 5 wherein the means supporting the rear of the picker unit and the means suspending the forward portion of the picker unit enables the picker unit to move laterally in relation to the frame, the engagement of the fingers with the cotton plants causing centralization of the picker unit with the cotton plants whereby the picker unit will be aligned with row of plants, and means connected with the picker unit for directionally controlling the path of movement of the frame thereby retaining the frame in proper orientation in relation to the row of plants.

7. The structure as defined in claim 6 wherein said mobile frame includes at least one steerable wheel, means connected with the steerable wheel for controlling the orientation thereof, said means being connected with the means engaging the picker unit for pivoting the steerable wheel in response to lateral movement of the picker unit when it moves to a centralized position in relation to the row of cotton plants thereby controlling the path of movement of the frame.

8. The structure as defined in claim 7 wherein said means connected to the steerable wheel includes a steering rod having a pinion gear thereon, a rack gear engaged with the pinion gear, a hydraulically operated piston and cylinder arrangement connected with the rack gear, and valve means incorporated into the hydraulic piston and cylinder arrangement for controlling operation of the rack gear, said valve means being connected with and controlled by the picker unit in response to the lateral movement of the picker unit in relation to the frame.

9. The structure as defined in claim 5 wherein said frame is provided with a longitudinally and rearwardly extending conveying means at the rear of the picker unit, and a transverse conveyor mounted on the frame communicating with the rear of the picker unit and with the front of the longitudinal rearwardly extending conveying means.

10. The structure as defined in claim 3 wherein said means engaging the ground surface includes a ground engaging feeler disposed forwardly of the picker unit, and a hydraulically operated piston and cylinder arrangement interconnecting the picker unit and the frame, and control valve means for the piston and cylinder arrangement, said control valve means including an operating handle, means interconnecting the operating handle and the feeler for operating the operating handle in response to movement of the ground engaging feeler thereby controlling the position of the valve means in response to movement of the feeler.

References Cited in the file of this patent

UNITED STATES PATENTS

| | | |
|---|---|---|
| 193,702 | Graves | July 31, 1877 |
| 406,266 | Cunningham | July 2, 1889 |
| 1,721,545 | Crane | July 23, 1929 |
| 1,763,646 | Callahan | June 17, 1930 |
| 2,509,914 | Goodwine | May 30, 1950 |
| 2,660,015 | Briscoe | Nov. 24, 1953 |
| 2,700,857 | Stearman | Feb. 1, 1955 |
| 2,830,425 | Stansfield | Apr. 15, 1958 |